US010930275B2

(12) United States Patent
Cartwright et al.

(10) Patent No.: US 10,930,275 B2
(45) Date of Patent: Feb. 23, 2021

(54) NATURAL LANGUAGE INPUT DISAMBIGUATION FOR SPATIALIZED REGIONS

(71) Applicant: Microsoft Technology Licensing, LLC, Redmond, WA (US)

(72) Inventors: Luke Cartwright, Seattle, WA (US); Richard William Neal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 16/224,310

(22) Filed: Dec. 18, 2018

(65) Prior Publication Data

US 2020/0193976 A1 Jun. 18, 2020

(51) Int. Cl.

| *G10L 15/00* | (2013.01) |
|---|---|
| *G10L 15/19* | (2013.01) |
| *G06N 20/00* | (2019.01) |
| *G06F 3/01* | (2006.01) |
| *G06F 3/16* | (2006.01) |
| *G06K 9/00* | (2006.01) |
| *G06T 19/00* | (2011.01) |

(52) U.S. Cl.
CPC .............. *G10L 15/19* (2013.01); *G06F 3/011* (2013.01); *G06F 3/167* (2013.01); *G06K 9/00671* (2013.01); *G06N 20/00* (2019.01); *G06T 19/006* (2013.01)

(58) Field of Classification Search
CPC ................................ G10L 15/22; G10L 15/25
See application file for complete search history.

(56) References Cited

U.S. PATENT DOCUMENTS

| 7,043,695 B2 | 5/2006 | Elber et al. |
| 7,403,890 B2 | 7/2008 | Roushar |
| 7,492,495 B2 | 2/2009 | Ishihara et al. |

(Continued)

OTHER PUBLICATIONS

Fukutake, et al., "3D Object Layout by Voice Commands Based on Contact Constraints", In International Conference on Computer Graphics, Imaging and Visualization, Jul. 26, 2005, 6 Pages.

(Continued)

*Primary Examiner* — Daniel Abebe
(74) *Attorney, Agent, or Firm* — Alleman Hall Creasman & Tuttle LLP

(57) ABSTRACT

A computing system is provided. The computing system includes a processor of a display device configured to execute one or more programs. The processor is configured to receive a command from a user by way of natural language input. The processor is configured to identity a set of candidate objects within or adjacent a user's field of view having associated spatialized regions on which the command can be executed, the set of candidate objects identified at least partially by using a machine learning model. The processor is configured to use visual or audio indicators associated with the candidate objects and query the user for disambiguation input. The processor is configured to receive the disambiguation input from the user that selects a target object, executing the command on the target object. The processor is configured to train the machine learning model using the disambiguation input and data about the spatialized regions.

20 Claims, 10 Drawing Sheets

(56) References Cited

U.S. PATENT DOCUMENTS

| | | |
|---|---|---|
| 7,952,783 B2 | 5/2011 | Holmes et al. |
| 8,107,147 B2 | 1/2012 | Hudman et al. |
| 8,248,541 B2 | 8/2012 | Brown et al. |
| 8,446,342 B2 | 5/2013 | Champion et al. |
| 8,711,186 B2 | 4/2014 | Champion |
| 9,693,029 B1 | 6/2017 | Jackson |
| 9,986,215 B1 | 5/2018 | Tardif et al. |
| 10,185,534 B2* | 1/2019 | Kanda ............... G06F 3/013 |
| 10,650,819 B2* | 5/2020 | Huang ............... G10L 15/30 |
| 2008/0001850 A1 | 1/2008 | Champion et al. |
| 2013/0073293 A1* | 3/2013 | Jang ............... G10L 15/22 |
| | | 704/275 |
| 2015/0088518 A1* | 3/2015 | Kim ............... G10L 15/22 |
| | | 704/251 |
| 2016/0313902 A1* | 10/2016 | Hill ............... G06T 19/006 |
| 2018/0004481 A1 | 1/2018 | Fallon |
| 2018/0011531 A1 | 1/2018 | Clement et al. |
| 2018/0046851 A1 | 2/2018 | Kienzle et al. |
| 2018/0307303 A1 | 10/2018 | Powderly et al. |
| 2019/0098070 A1* | 3/2019 | Kim ............... G02B 27/01 |
| 2019/0258318 A1* | 8/2019 | Qin ............... G06F 3/04842 |
| 2019/0295542 A1* | 9/2019 | Huang ............... G06F 3/167 |

OTHER PUBLICATIONS

"International Search Report & Written Opinion issued in PCT Application No. PCT/US19/65412", dated Mar. 11, 2020, 36 Pages.

* cited by examiner

NATURAL LANGUAGE INPUT DISAMBIGUATION FOR SPATIALIZED REGIONS

BACKGROUND

Augmented reality (AR) and virtual reality (VR) environments may present an array of virtual objects to a viewer. An AR or VR system may be designed to receive different types of input from a user as well as respond to the user's input. For example, eye-tracking and gesture recognition have become part of many AR/VR device capabilities, and AR/VR devices can respond to user input with audio and/or visual output. Depending on the system, a user of an AR/VR device may be offered a variety of ways with which to interact with the virtual objects and real objects recognized by the system, whether by way of natural language input, gaze, gestures, and/or haptic responses. One challenge for current AR/VR systems is to properly interpret the user's input as the user attempts to interact with the real and virtual objects in the AR/VR environment.

SUMMARY

A computing system is provided. The system may include a processor of a display device configured to execute one or more programs. The processor may be configured to receive a command from a user by way of natural language input. The processor may be further configured to identify a set of candidate objects within or adjacent a user's field of view via the display device having associated spatialized regions on which the command is capable of being executed, the set of candidate objects being identified at least partially by using a machine learning model. The processor may be configured to display visual indicators or emit audio indicators associated with each of the candidate objects and query the user for a disambiguation input via the indicators. The processor may be further configured to receive the disambiguation input from the user that selects a target object from the set of candidate objects and execute the command on the target object. The processor may be configured to train the machine learning model using the disambiguation input and data about the spatialized regions associated with the selected target object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Applications of augmented reality (AR) and virtual reality (VR) systems continue to expand, with technological improvements at times opening new possibilities for user experiences. Within this evolving field is an effort to improve user interaction with AR/VR environments. One way in which user interaction may be improved is by offering a user the ability to communicate with an AR/VR system using natural language input. Enabling the user to speak vocal commands to the AR/VR system, for example, can free the user's hands for other tasks, such as forming gesture commands, within the AR/VR environment.

The inventors have recognized that one particular problem in the area of natural language processing is determining which entities or objects in an AR/VR environment are the intended targets of voice commands from the user. The inventors have also recognized that the system may accept other forms of input from the user, such as gaze and gesture input, concurrently or close in time to receiving the voice commands, in order to assist in determining to which entity or object the user is directing a command within the AR/VR environment. However, even with these additional inputs, the system may fail to consistently identify a target object in the AR/VR environment with a suitable degree of accuracy.

To address these challenges, the inventors have conceived of a computing system that may implement disambiguation as one approach to solving this problem. The system may be configured to, once a set of possible targets for a user's command is determined, query the user for additional information in the form of a disambiguation input, which identifies the intended target from the set of possible targets. This disambiguation input may be used not only to select a target in a current interaction, but may be used as feedback to train a machine learning model to improve the accuracy of the machine learning model for future interactions. In this way, the user's actual intention may be learned from and applied to modeling future interactions with the user. Specific example implementations of this general approach are discussed further below.

Figure 1:
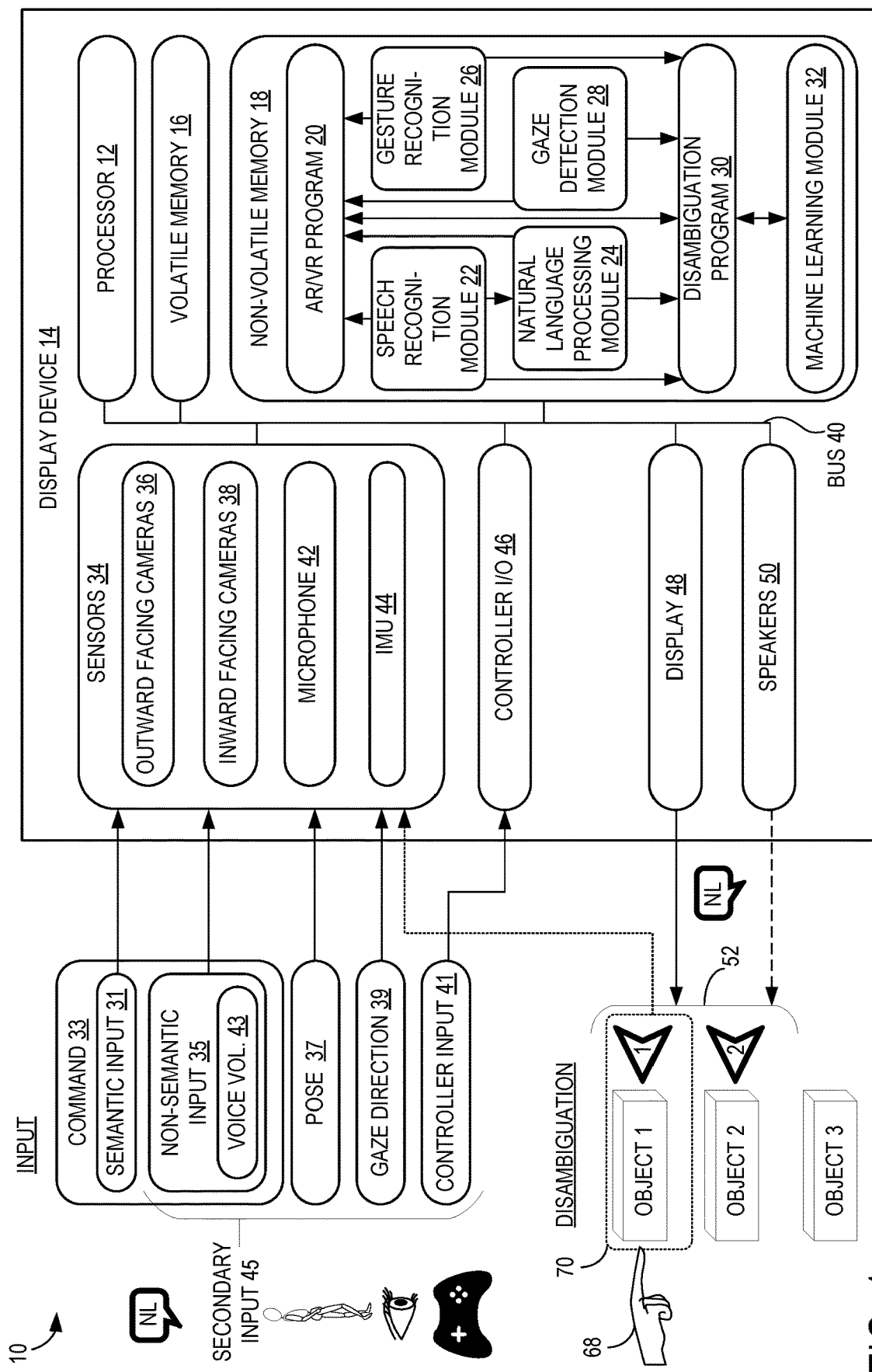
FIG. 1 shows a computing system according to an example embodiment of the present disclosure.

FIG. 1 depicts an example of a computing system 10 according to one implementation of the present disclosure. The computing system 10 may include a processor 12 of a display device 14 configured to execute one or more programs. The display device 14 may include volatile memory 16 which the processor uses while executing the programs and non-volatile memory 18 for storage of the programs. For example, stored in non-volatile memory 18 may be an AR/VR program 20, a disambiguation program 30, and a machine learning (ML) module 32. The ML module 32 may execute a machine learning model and exchange data with the disambiguation program 30 as described below. The non-volatile memory 18 may also store a speech recognition module 22, a natural language processing (NLP) module 24, a gesture recognition module 26, and a gaze detection module 28. The speech recognition module 22 may process speech input such as voice commands and relay vocal user input data to the AR/VR program 20 and disambiguation program 30.

Similarly, the NLP module 24 may receive input from the speech recognition module 22 and send data to the AR/VR program 20 and the disambiguation program 30. It will be appreciated that the recognized speech input is typically an array of tokenized text strings. The NLP module 24 receives the recognized speech input from the speech recognition module 22, and processes the recognized speech input by segmenting sentences, tagging parts of speech, and extracting commands and names of objects associated with the commands. If the NLP module 24 detects natural language input and/or command keyword input including a recognizable command (such as "open," "close," etc.) the NLP module 24 attempts to also detect a name of a target object to which the command is to be applied. However, the NLP module 24 is a statistical machine translation model, and thus the model's confidence with regard to the detection of a command and/or entity name of an object associated with the command has an associated confidence value. As discussed below, there are instances in which the confidence value for a command or for an object associated with the command are lower than a predefined minimum threshold for proper processing, resulting in a need to resolve the ambiguity in the input recognized speech.

Also exchanging data with the AR/VR program 20 and disambiguation program 30 may be the gaze detection module 28, which may be configured to process image data collected by inward facing cameras 38, discussed below, to identify the position and orientation of each of a user's eyes and generate eye-tracking data therefrom. The gesture recognition module 26 may be configured to identify gestures performed by the user by processing image data of the user collected by outward facing cameras 36, also discussed below, when these cameras capture images of portions of the user's body, such as the user's hands.

Also included in the display device 14 may be a plurality of sensors 34 of various types. The sensors 34 may include the outward facing cameras 36 discussed above and the inward facing cameras 38 discussed above, which are configured as eye trackers that track the gaze direction of the user's eyes. The sensors 34 may further include a microphone 42 and an inertial measurement unit (IMU) 44, which in turn may include accelerometers, gyroscopes and/or a compass that can detect, for example, a 6 degree of freedom (6DOF) position and orientation of the display device. The processor 12 may further refine the 6DOF output of the IMU using visual tracking systems that search for movement of identified visual features in a series of images captured by the outward facing cameras and generate an estimate of the relative movement of the display device 14 based upon the movement of these visual features within successive image frames captured by the outward facing cameras over time. The microphone or one or more of the cameras may be integrated with the display device 14, or provided separately therefrom. The display device 14 may be configured to receive input from an external controller, and accordingly controller input/output software 46 may also be included. A display 48 may be integrated with the display device 14, or optionally provided separately therefrom. Speakers 50 may be included in the display device 14, or provided separately therefrom. It will be appreciated that these components may be connected via a data bus 40.

Figure 2:
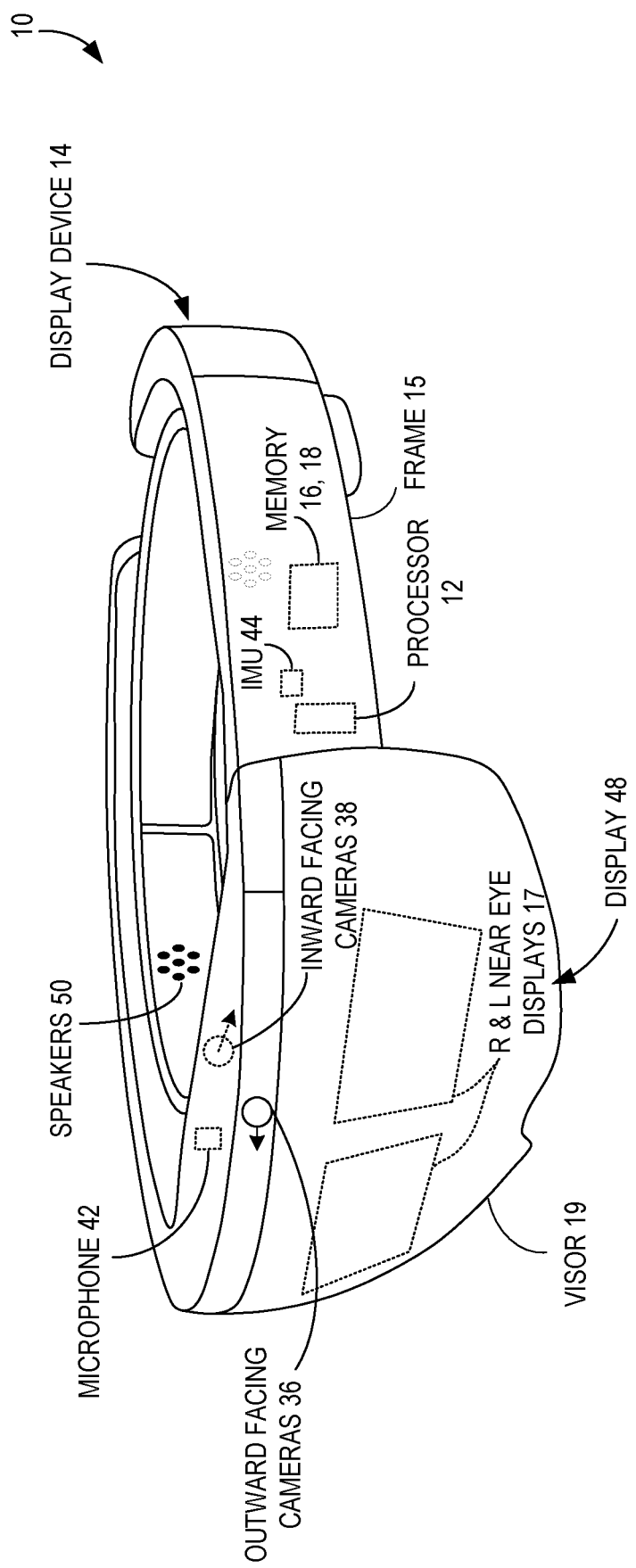
FIG. 2 is an example implementation of the computing system of FIG. 1 in a display device that is embodied in a head mounted device.

As shown in FIG. 2, display device 14 may be embodied in a head mounted device. The processor 12, volatile and non-volatile memories 16, 18, outward facing cameras 36, inward facing cameras 38, microphone 42, IMU 44, and speakers 50 may be incorporated within a housing of the head mounted device as shown. The head mounted device may include a frame 15 that at least partially encircles the head of a user, and the display 48 may include a pair of right and left near-eye displays 17. The near-eye displays 17 may be positioned behind a visor 19 through which a user may observe the physical surroundings in an AR system. It will be appreciated that the near eye displays 17 and visor 19 are at least partially transparent, enabling the user to see through these components to view the real environment, at least when content is not opaquely displayed on the near-eye displays 17.

Returning to FIG. 1, the processor 12 may be configured to receive a command 33 from a user by way of natural language input (NLP). The command 33 from the user may be received as a vocal command, and in such a case the command 33 may be received via the microphone 42 of the display device 14. Alternatively, the command 33 may be via text input or through a controller. Once the command 33 is received, the processor 12 may be configured to, from data in the AR/VR program 20 and input from the sensors 34, identify a set of candidate objects 52 within or adjacent the user's field of view 54 via the display device 14. This is schematically represented in FIG. 1, where object 1 and object 2 form the set of candidate objects 52 within or adjacent the user's field of view 54. Object 3 is illustrated but has not been selected as a candidate object 52.

In an AR/VR environment, a plurality of objects may be present, both real and virtual, that may respond to the same voice command 33 given by the user. For example, if the user says, "Turn down the brightness," and the AR environment currently includes a virtual lamp, a virtual window showing an outdoor image of the sun, and a virtual file window in which the user may be working, the system 10 may not be able to determine to which light-emitting object of these three objects the user is referring. However, if there are other virtual objects in the augmented reality environment such as a virtual animal and/or a virtual plant, the system 10 may determine that the set of candidate objects 52 that may include the intended object of the user's command 33 is likeliest to include the virtual lamp, the virtual window, and the virtual file window, for example, based on a trained machine learning model that has been trained in a manner that indicated the virtual plant and virtual pet only very rarely receive brightness adjustments from users, and thus the confidence value that the brightness adjustment command is associated with these virtual objects would be below a predefined threshold for including them in the set of candidate objects 52.

It will be appreciated that each of the candidate objects 52 may have an associated spatialized region on which the command 33 is capable of being executed. Each associated spatialized region may be a bounded region of geometric space that the system 10 determines and/or assigns to be the volume bounding each of the candidate objects 52. It will be appreciated that the spatialized region may also be empty of objects, such as a center of an empty room, etc. Typically, the spatialized region of each candidate object is three dimensional; however, two dimensional spatialized regions may also be used in some implementations.

Before constructing the set of candidate objects 52 and when receiving a command 33 from the user, the processor 12 may be configured to identify secondary input 45 from the user, which may be received from the sensors 34 as indicated schematically in FIG. 1. The command itself may include semantic input 31, which may include words within an associated lexicon that have associated meanings.

Semantic input 31 thus is language input, and may be distinguished from non-semantic input in the vocal command, as discussed below.

The secondary input 45 may include one or more of a non-semantic input 35 of the command 33, a pose 37 of the user, a gaze direction 39 of the user, and a controller input 41 of a controller operated by the user. Non-semantic input 35 refers to aspects of vocal command 33 that are not the words themselves, but which are features otherwise contained within the command 33. Examples of non-semantic input 35 include voice volume 43, as well as other aspects of the voice command 33 such as intonation, pauses, speaking rate, voice directionality. Pose 37 is the pose of the user, which includes the positioning of all or a portion of the user's body. Thus pose 37 includes, but is not limited to, hand position, hand shape, gesture, head position, leg position, and body orientation. Several poses 37 may be examined over time and the user movement as represented by the difference in the poses may also be considered as secondary input 45. Controller input 41 may include controller direction and/or controller position, as well as the combination of controls actuated on the controller by the user, for example. Secondary input 45 may also include an additional input parameter from the AR/VR program 20. Such additional input parameters may include distance of objects from the user, locked status of an object, movement of one or more objects, object translucency, object visibility, and/or previously processed interaction of the user with the object.

As one specific example of receiving secondary input 45 from the sensors, hand position and hand shape may be recorded by the outward facing cameras 36 of the display device 14, while gaze direction 39 may be tracked by the inward facing cameras 38. Secondary input 45 such as this may be combined as information relevant to determining a set of candidate objects 52, as described below. From the following discussion it will be appreciated that one potential advantage of this configuration may be that secondary input 45 generated from the user may be received by the system 10 to improve accuracy of response by the system 10 to user selection of a target object 70.

In one example, eye-tracking data taken from inward facing cameras 38 may record that the user has a line of sight that intersects overlapping spatialized regions containing real and/or virtual objects when issuing a command 33. The system 10 may thus determine that the objects associated with the overlapping spatialized regions through which the user's line of sight passes should be included in a set of candidate objects 52 on which the command is intended by the user to be executed. As described further below, the system 10 may process secondary input 45 to determine whether particular spatialized regions associated with the real and/or virtual objects are indicated by the secondary input 45.

Figure 3:
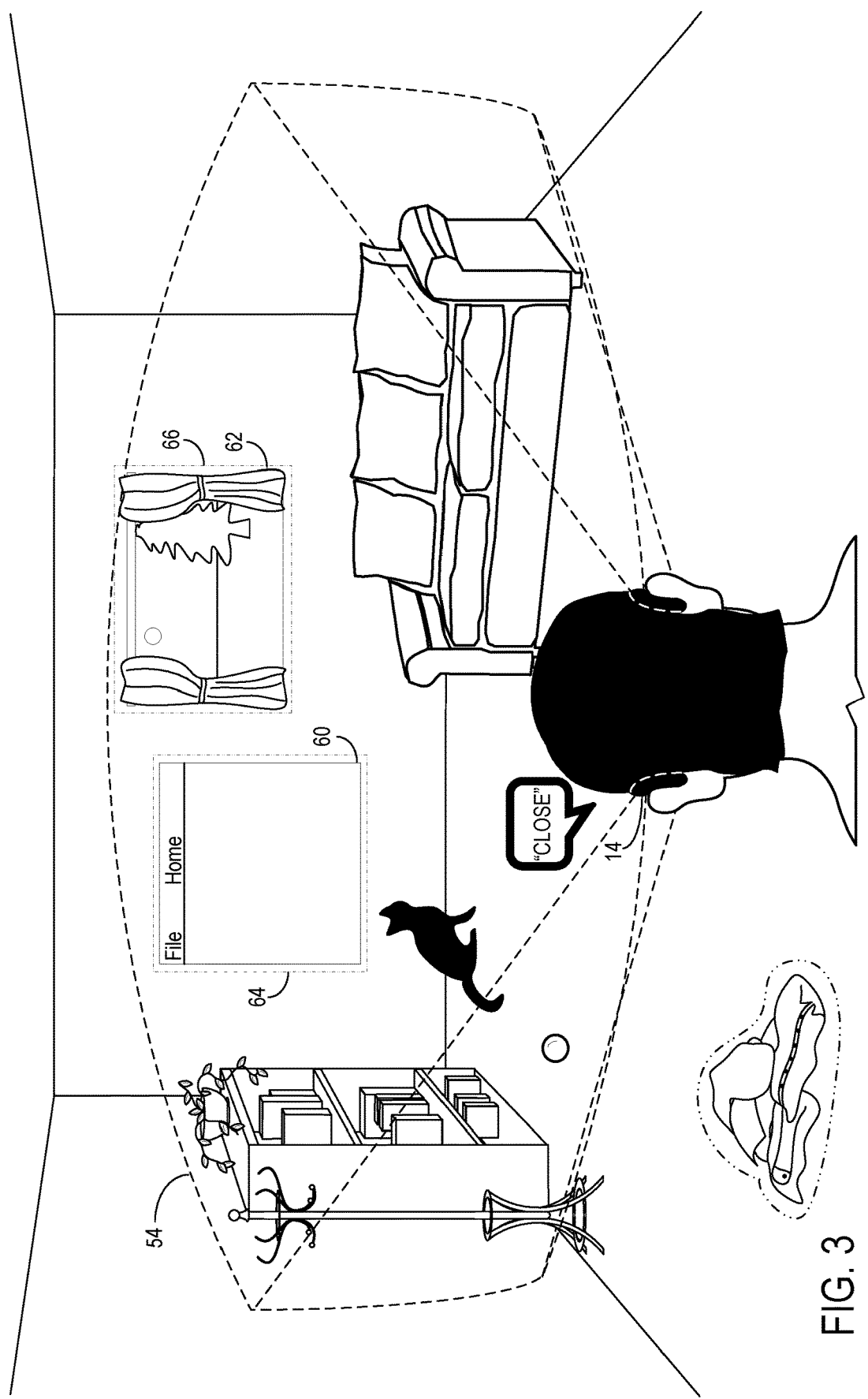
FIG. 3 shows an augmented reality environment viewed using the computing system of FIG. 1, according to one example of the present disclosure.

FIG. 3 shows a first example of an AR environment integrated with the computing system 10. The AR environment, in this example, may include a physical room filled with physical objects such as a couch and/or bookshelf, and also may include virtual objects such as a virtual file window 60 and a virtual window 62 displaying a virtual view of an outdoor scene. In this example, the user utters a command 33 such as "Close", which is recognized by the speech recognition module 22 discussed above. The computing system 10 via the processor 12, using input from the sensors 34, may determine a set of candidate objects 52 to which the command 33 "Close" can be applied, as described below.

As described above, secondary input 45 may be received by the sensors 34 and/or additional input parameters may be known to the AR/VR program 20, as in the case of distance of virtual objects from the user. From user pose 37, the system 10 may determine that the user's body is more oriented to face the virtual window 62, although the user's gaze direction 39 may be oriented toward the virtual file window 60. The user may be closer to the virtual file window 60 as known to the AR/VR program 20, but only by a trivial distance that is insufficient for disambiguation by the AR/VR program itself. Associated spatialized regions that are the geometric regions determined by the system 10 may bound each of the selected candidate virtual objects, which in this example are first spatialized region 56 and second spatialized region 58. These spatialized regions may define the geometric areas to which the user's pose 37 and gaze direction 39 are directed. From this information, the system 10 may first determine that the virtual file window 60 and virtual window 62 are to be included in the set of candidate objects 52, as indicated in FIG. 3 with a dot-dot-dash line. However, from this information alone the system may not conclusively determine whether the user means to direct the command 33 "Close" to the virtual file window 60 or the virtual window 62.

The set of candidate objects 52 may be identified at least partially by using machine learning model, illustrated in FIG. 1. In the system 10, secondary input 45 may be included as data fed to a machine learning model to expedite execution of user commands 33. For example, the user may repeat the command 33, "turn down the brightness" a number of times while interacting with the system 10 that may include such objects as a virtual lamp, a virtual window having an outdoor image of the sun, and a virtual file window in which the user may be working, each of which has an adjustable brightness associated with it. Each time, the sensors 34 may record that the user either gestures or glances toward a particular spatialized region associated with the virtual lamp 75% of the time and the virtual file window 25% of the time. Thus, by feeding this sensor data to the system 10, the machine learning model 32 may include the virtual lamp and the virtual file window in a set of candidate objects 52 upon the next instance of the user uttering, "turn down the brightness", while excluding the virtual window with the outdoor image of the sun. This specific example illustrates the general concept that machine learning model 32 may have its weights adjusted based on usage data over time.

In the example of FIG. 3, the machine learning model 32 may have learned from previous interactions with the user that 75% of the time when the user issues the command 33 "Close", the user intends either the virtual file window 60 or the virtual window 62 to receive the command. Thus, the machine learning model 32 may select the virtual file window 60 and the virtual window 62 to be included in the set of candidate objects 52.

The processor 12 may be configured to display visual indicators or emit audio indicators associated with each of the candidate objects 52. This is illustrated schematically in FIG. 1, where visual indicators in the form of arrowheads 1 and 2 may be visually presented to the user to indicate that object 1 and object 2 are in the set of candidate objects 52. In the example of FIG. 1, it will be appreciated that object 3 is not selected by the system 10 to be included in the set of candidate objects 52. Thus, no indicator is present in the vicinity of object 3.

Figure 4A:
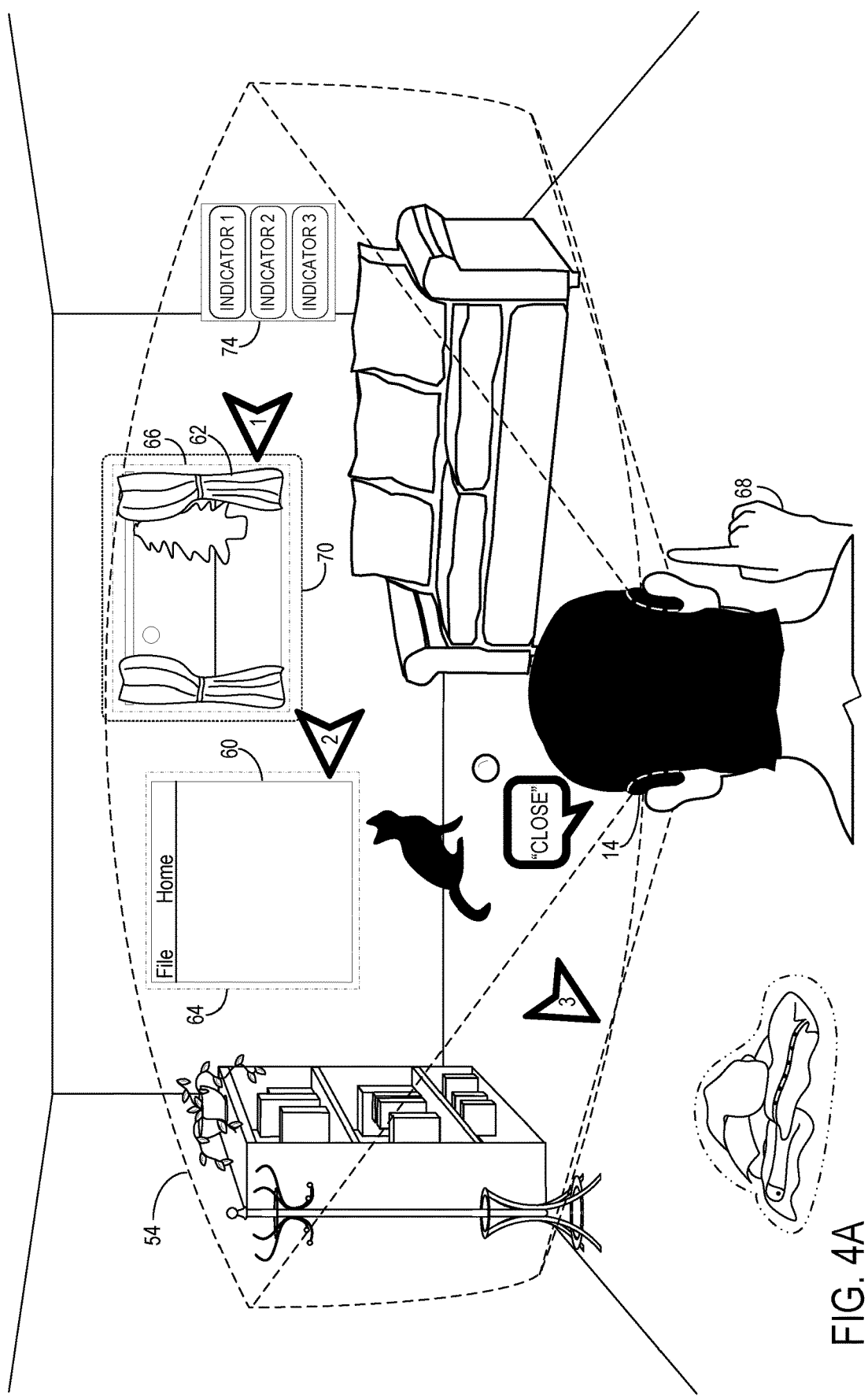
FIGS. 4A-4D each show an augmented reality environment viewed using the computing system of FIG. 1, according to another example of the present disclosure.

The indicators may take various forms, including bounding boxes, highlighted object perimeters, tooltips, directional indicators, overlapping indicators, and auditory indicators. A graphical user interface (GUI) 74 associated with the indicators associated with each of the candidate objects 52 may be provided. FIG. 4A shows a three-dimensional example of an AR environment integrated with the system 10. In this figure, an implementation of directional indicators shown as arrowheads, along with a GUI 74 listing the indicators. The example GUI 74 is shown to represent each of three indicators to the user. This may be convenient to the user who may indicate the target object 70 by saying, "the top object" without having to scan the field of view 54 for all of the indicators. GUI 74 may be displayed in a screen locked manner so as to be always visible by the user, in one example. The virtual objects to which arrowheads 1 and 2 point are world locked, and thus these indicators would be world locked in FIG. 4A, while arrowhead 3 would be screen locked as it is pointing to a virtual object off screen.

The candidate objects 52 may be virtual objects or real objects, and at least one object in the set of candidate objects 52 may be offscreen of a display 48 of the computing device. This is shown in FIG. 4A, where a pile of clothes 72, a real object, is indicated as included in the set of candidate objects 52 even though it is outside the user's field of view 54. A potential advantage of this configuration then is that disambiguation may be possible for commands 33 from the user directed to objects not currently in the user's field of view 54. If the system 10 determines that the object outside of the user's field of view is to be included in the set of candidate objects 52, an indicator (i.e., arrowhead 3) may be presented to the user at a location within the user's field of view that is closest to the object, as shown in FIG. 4A.

Figure 4B:
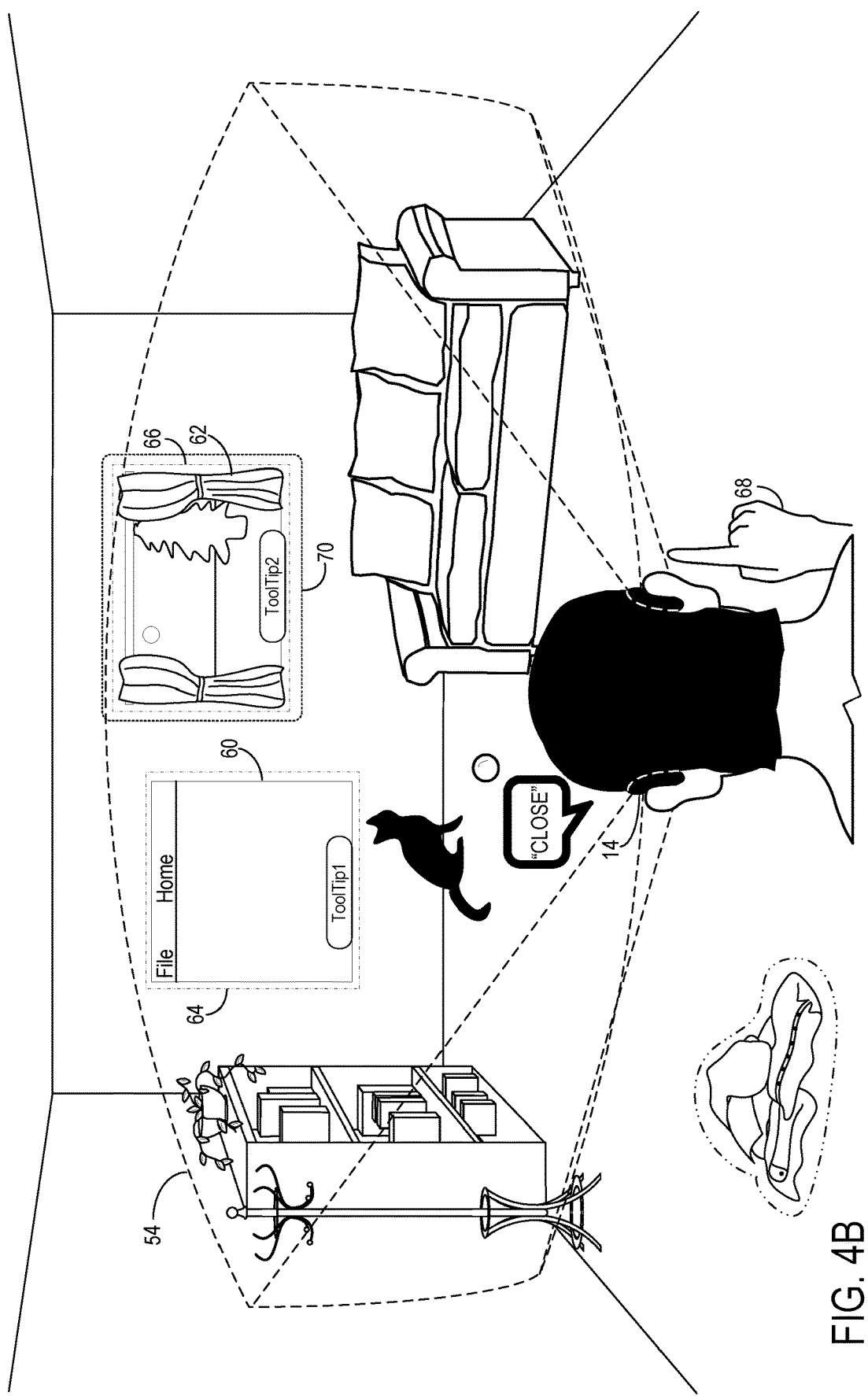
Figure 4C:
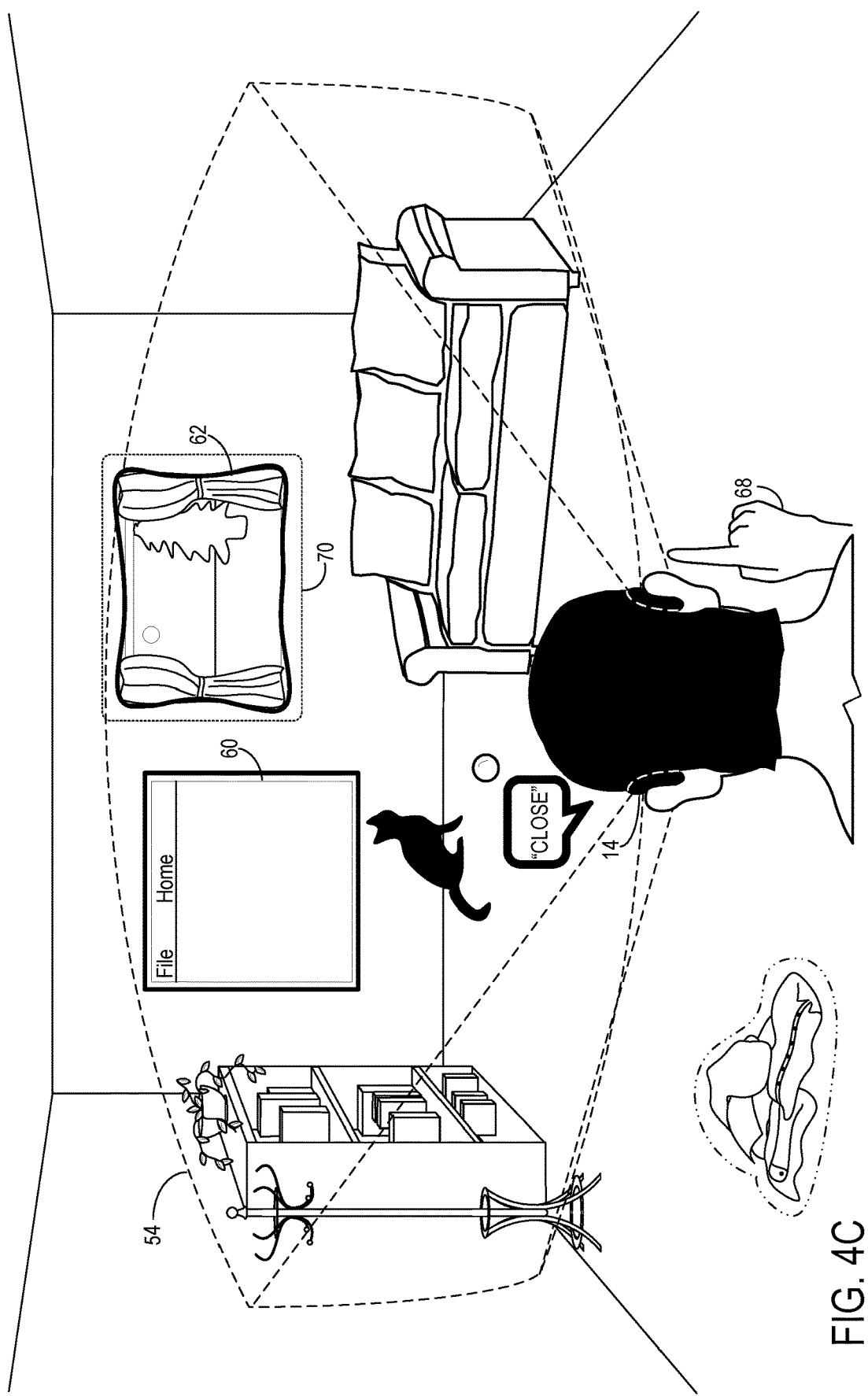
Figure 4D:
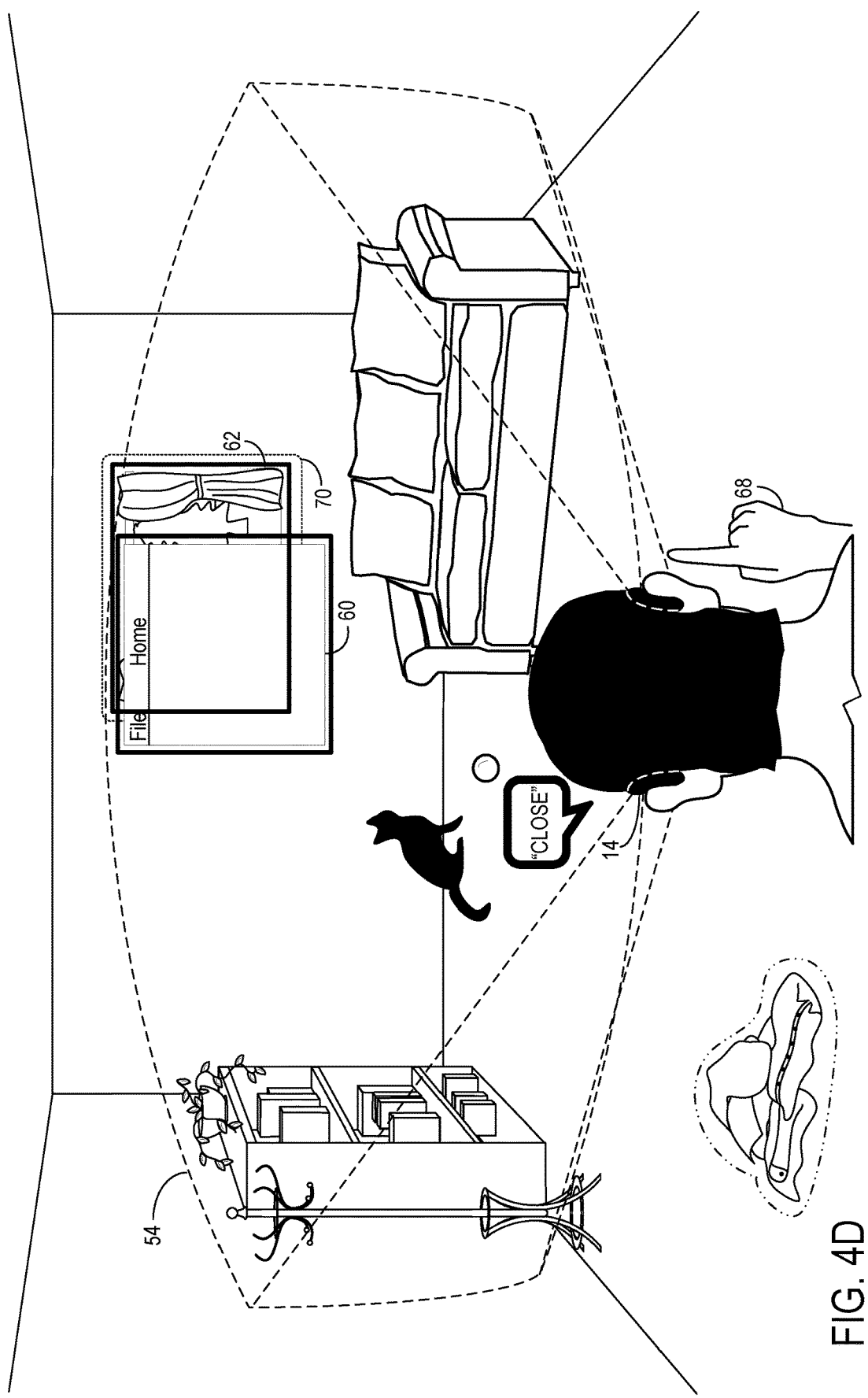

In an additional example, FIG. 4B displays tooltip indicators. It will be appreciated that in FIG. 4B, no tooltip is associated with the "clothes" as this object is outside the user's field of view. Regarding FIG. 4C, the file window 60 and the virtual window 62 have highlighted object perimeters as indicated with a bold line. FIG. 4D, alternatively, demonstrates overlapping indicators where the indicators are bounding boxes for the file window 60 and the virtual window 62. One potential advantage of the system 10, therefore, is that the system may be customizable to the user's preferences and convenience.

Alternatively to visual indicators, the speakers 50 may be used to emit audio indicators. This may, for example, take the form of an audio icon such as a ringing bell being played when the user looks at one of the set of candidate objects 52 as determined by the eye tracking data from inward facing cameras 38, or audio output such as synthesized speech that names the candidate objects 52.

The processor 12 may be configured to query the user for a disambiguation input 68 via the indicators and receive the disambiguation input 68 from the user that selects a target object 70 from the set of candidate objects 52. The query may take the form of the visual indicators alone or may include an audio query generated by the processor 12 and played via the speakers 50. In FIG. 1, the disambiguation process is schematically represented by arrowhead indicators 1 and 2 as well as natural language that may be generated as a query from the speakers 50. For example, the system 10 may generate speech querying the user, "Do you mean object 1 or object 2?" The user may respond with a gesture that is disambiguation input 68 indicating object 1 as the target object 70. In FIG. 4A, the user responds to the query with a gesture as disambiguation input 68 to indicate the virtual window 62 as the target object 70.

The disambiguation input may include at least one type of input from speech input, gaze input, gesture input, and text input. For example, if a controller is included in the system 10, the user may type a response into the controller to indicate a target object 70 after being given a set of indicators. This may be advantageous if the user is in the process of taking a call, for example. Alternatively, the system 10 may be configured to detect, via the inward facing cameras 38, that the user blinks in the direction of an object to indicate the target object 70.

The processor may be configured to execute the command 33 on the target object 70. In the example given above for FIG. 4A, this may include removing the virtual window 62 from the AR environment. Alternatively, the command 33 may be executed by closing the drapes on the virtual window 62. If the system 10 is unable to determine which action is preferred by the user, further disambiguation may proceed.

The machine learning model may be trained using the disambiguation input 68 and data about the spatialized regions associated with the selected target object 70. For example, the system 10 may proceed with further disambiguation to determine whether the gesture by the user indicates closing the drapes of the virtual window 62 or removing the virtual window 62 entirely. Repeated instances of this situation with gesture input as the disambiguation input 68 being fed to the machine learning model may train the model to determine that when the user merely points with a gesture, the entire virtual window 62 should be removed and when the user gestures with a back-and-forth hand movement the drapes of the virtual window 62 should be closed. It will be appreciated that without disambiguation input 68, it may be difficult to establish a ground truth for the user's intent, the ground truth being important to adjusting the weights in the machine learning model. One potential advantage of this configuration is that a machine learning model may be better trained to effectively execute user commands 33 with the inclusion of disambiguation input 68 that may improve the future accuracy of the machine learning model.

It will be appreciated that the processor 12 may be configured to train an algorithm to select the target object 70 instead of or in addition to the machine learning model 32. As the processor 12 may be configured to weight the secondary input 45 from the user to determine a probability for each of the candidate objects 52 to be the target object, the processor 12 may train the algorithm with weighted secondary input 45 from the user. An illustrative example of a such an algorithm applied in a specific scenario will now be described.

The system 10 may begin with gaze direction 39, user body position, and distance of candidate objects 52 from the user as inputs. Gaze direction 39 with respect to spatialized regions of the candidate objects 52 may be processed and, in the example of FIG. 3, gaze direction 39 may be determined to indicate virtual file window 60, 65% and virtual window 62, 35%. User body position may indicate virtual file window 60, 20% and virtual window 62, 80%. The distance of candidate objects 52 from the user may indicate the virtual file window 60, 70% and virtual window 62, 30%. As such, it may not be clear from this data whether the user means the virtual file window 60 or the virtual window 62 to receive the command.

An algorithm may be applied that throws out the lowest indicators for each candidate object 52. The 20% indication of the virtual file window 60 by user body position and the 30% indication of the virtual window 62 may be ignored. Thus, it may be determined by the system 10 that the virtual file window 60 is the likeliest target object 70 of the command 33. However, in some cases throwing out the lowest indicators for each candidate object 52 may result in an indeterminable state, or some candidate objects 52 may be disregarded while the remaining candidate objects 52 are within a similar range of likeliness; the algorithm may then trigger disambiguation. On the other hand, an algorithm may be applied that determines disambiguation is necessary when the total likelihood of all candidate objects 52 is within 10% of each other.

Figure 5:
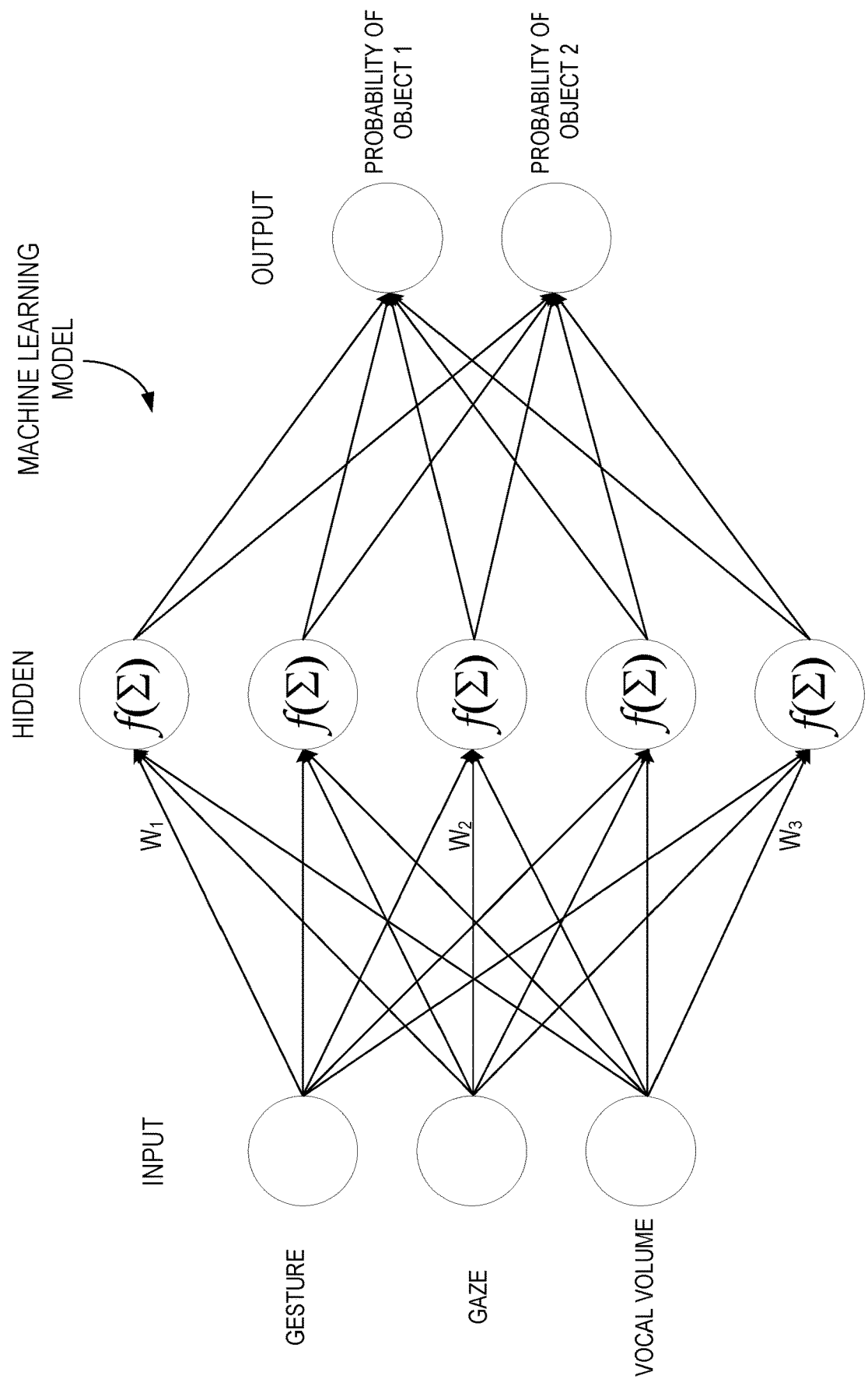
FIG. 5 is a schematic depiction of a machine learning model for use with the computing system of FIG. 1, according to one example of the present disclosure.

Alternatively or additionally, the processor 12 may train the machine learning model using the weighted secondary input 45 from the user. Training of a machine learning model may be realized through the use of a deep learning neural network with an input layer, an output layer, and multiple hidden layers therebetween. FIG. 5 is an example implementation of such a neural network that may be used as the machine learning model 32 of the system 10. In this example, inputs from the user including gesture, gaze, and vocal volume are shown. However, any number of inputs may be accepted by the system 10. During a training phase, a training dataset may be used to train the neural network. The training data set includes pairs of inputs and curated outputs. Backpropagation is used to adjust the weights of the neural network so that the weights between the nodes in the hidden layers are adjusted to reflect the inputs mapping to particular outputs. By training the network on large numbers of input-output pairs, the neural network can come to recognize patterns in the inputs. When presented with new inputs not in the training data set, these same patterns may be recognized by the trained model and an output predicted. Thus, inputs may be weighted and processed to determine the probability that object 1 is the target object 70 and the probability that object 2 is the target object. For example, a pointing gesture may receive a certain weight $W_1$ while a gaze may receive a different weight $W_2$. A potential advantage of the configuration is that with repeated disambiguation input 68 being fed to the machine learning model, probabilities of various objects being the target object 70 may be more rigorously established and the system 10 may execute commands 33 from the user with greater accuracy.

The processor 12 may be configured to train a speech recognition model using the command 33 and disambiguation input 68. The speech recognition model may be configured to output processing of vocal input to disambiguate similar sounding words of the user. One example is given in FIG. 4A, where the user gives the command 33 "Close". The system 10 may not be able to discern whether the user has uttered "close" or "clothes". The user may, for example, wish to "close" a window, or possibly prefer to add "clothes" to a to-do list. Since the system 10 may not be capable of determining the difference from the user's speech, indicators may be generated and disambiguation input 68 requested. Once the user provides the disambiguation input 68 and the data is fed to the speech recognition model, the system 10 may gain improved speech recognition for the user. A potential advantage of this configuration is that when the user again utters the word "close", the system 10 does not mistake the command 33 for the word "clothes".

For a system 10 that implements a machine learning model, the model may, over time, refine the weights associated with various user input such that disambiguation ceases to be common. That is, the system 10 may be able to differentiate between a user issuing the command 33 "Close" to be directed to, for example, the virtual file window 60 and the same command 33 being directed to the virtual window 62. Therefore, the processor 12 may be further configured to, via the machine learning model, execute the command 33 from the user without disambiguation input 68 from the user. However, the training may not result in a model that always provides a correct response to the user in selecting target object 70. Upon executing a command 33 with incorrect output, such as the system 10 automatically closing the virtual window 62 when the user actually means the virtual file window 60, the processor 12 may be configured to receive a new interaction from the user including a new command 33 to correct the action of the machine learning model. The processor 12 may be configured to further train the machine learning model using the new disambiguation input and data about the spatialized regions associated with a newly selected target object. It may be recognized by the system 10 that when the user wishes to close the file window 60, the user tends to gaze downward after issuing the command 33. This data may be used to determine future automatic responses by the system 10, which may learn to close the virtual window 62 when the user continues to look ahead and to close the file window 60 when the user looks down after issuing the command 33.

Figure 6:
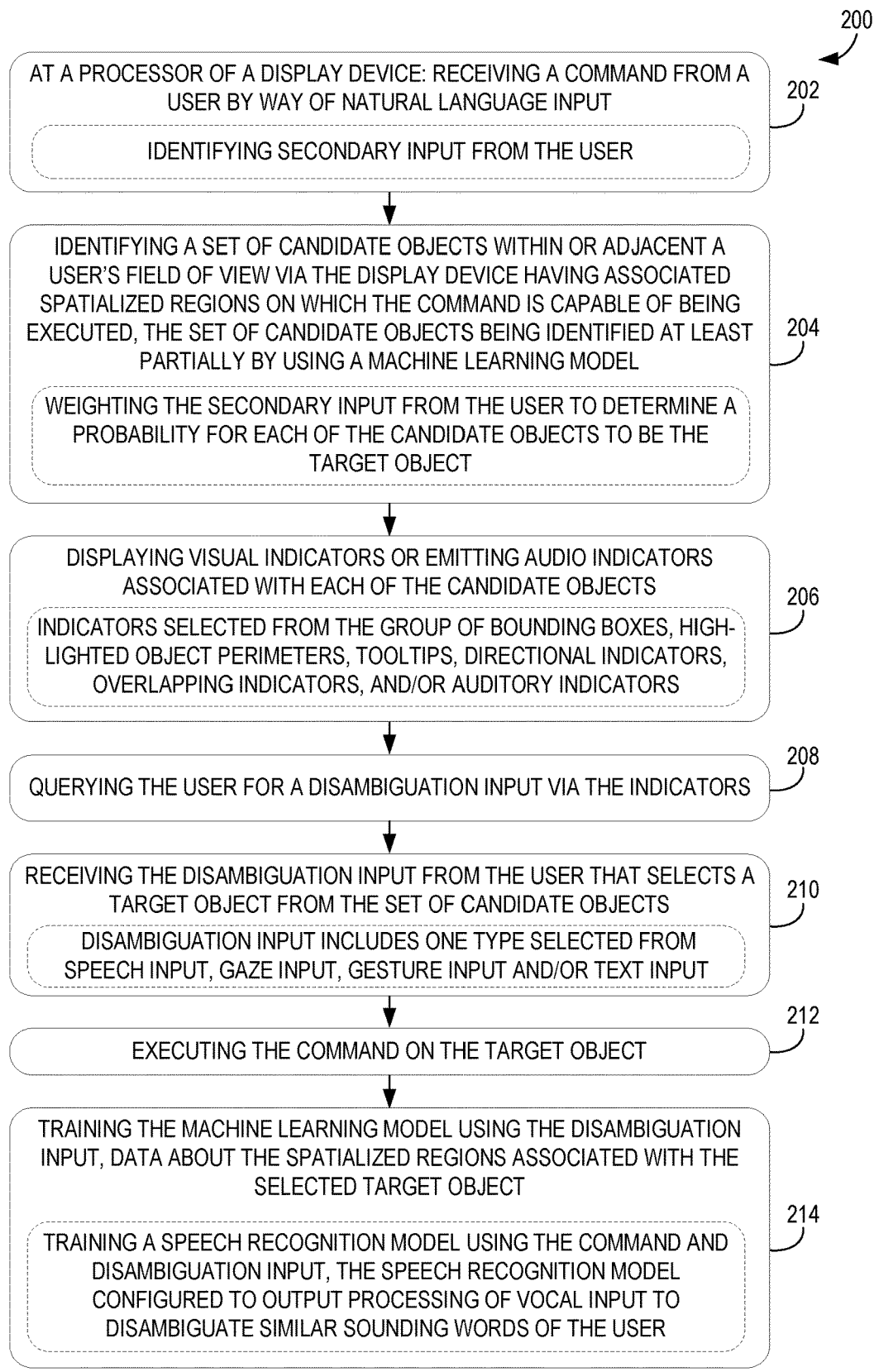
FIG. 6 is a flowchart of a method according to one implementation of the present disclosure.

FIG. 6 shows a flowchart of a method 200 for use with a computing device of the computing system 10. The following description of method 200 is provided with reference to the computing systems 10 described above and shown in FIG. 1. It will be appreciated that method 200 may also be performed in other contexts using other suitable components.

With reference to FIG. 6, the method 200 may be for use with a computing device. The method 200 at 202 may include, at a processor 12 of a display device 14, receiving a command 33 from a user by way of natural language input. The command 33 may be received as a vocal command 33 or may alternatively be issued by text or controller input. The method 200 may, as described above, further include at 202 identifying secondary input 45 from the user. The secondary input 45 from the user may be pose 37 and/or gaze direction 39 of the user received by the sensors 34 at the time the command 33 is issued. The method 200 at 204 may include identifying a set of candidate objects 52 within or adjacent a user's field of view 54 via the display device 14 having associated spatialized regions on which the command 33 is capable of being executed, the set of candidate objects 52 being identified at least partially by using a machine learning model. At 204, the method 200 may further include weighting secondary input 45 from the user to determine a probability for each of the candidate objects 68 to be the target object 70. As described above, the candidate objects 52 may be determined by secondary input 45 from the user indicating real or virtual objects in the environment. To reiterate with an example, the user may have gestured toward several objects each having an associated spatialized region when issuing a command 33 that may be received by two or more of the objects. The gesture may be determined to be a wave that is closer to the spatialized regions of two of the objects, and thus the two closest objects to the wave may be determined to be the set of candidate objects 52.

At 206, the method 200 may include displaying visual indicators or emitting audio indicators associated with each of the candidate objects 52. Continuing with the example above, the system 10 may show a blinking perimeter around the spatialized regions of the two candidate objects 52 via the display 48. As described above and shown in FIGS. 4A-4D, the indicators may be selected from the group consisting of bounding boxes, highlighted object perimeters, tooltips, directional indicators, overlapping indicators, and auditory indicators.

The method 200 at 208 may include querying the user for a disambiguation input 68 via the indicators. For example, a GUI 74 may be displayed near the blinking candidate objects 52. If one candidate object 52 has a red blinking perimeter and the other candidate object 52 has a blue blinking perimeter, the GUI 74 may display the words, "Red or blue?" At 210, the method 200 may include receiving the disambiguation input 68 from the user that selects a target object 70 from the set of candidate objects 52. The user may, for example, say "The red one." The disambiguation input 68 may include, at 210 of method 200, at least one type of input selected from the group consisting of speech input, gaze input, gesture input, and text input. The method 200 at 212 may include executing the command on the target object 70.

At 214, the method 200 may include training the machine learning model using the disambiguation input 68 and data about the spatialized regions associated with the selected target object 70. Further at 214, the method 200 may further include training a speech recognition model using the command 33 and disambiguation input 68, the speech recognition model configured to output processing of vocal input to disambiguate similar sounding words of the user. Referencing the discussion above, this may train the system 10 to distinguish between instances when the user speaks the word "close" or the word "clothes".

The method 200 may further include, as described above, training the machine learning model using the weighted secondary input 45 from the user. Alternatively, the method 200 may further include training an algorithm to select the target object 70 with the weighted secondary input 45 from the user.

As described above, the secondary input 45 may include one or more of a non-semantic input 35 of the command 33, a pose 37 of the user, a gaze direction 39 of the user, and a controller input 41 of a controller operated by the user. While some of these inputs may be received by the sensors 34, additional input parameters may be known already by the AR/VR program 20 that may include previously processed interaction of the user with an object, as one example.

As further described above, the candidate objects 52 may be virtual objects or real objects. An additional example may include an automated environment where a motor may be configured to close the panes of a real window via an electronic signal or a virtual window may be closed when the user issues the command 33, "Close window". At least one object in the set of candidate objects 52 may be offscreen a display 48 of the computing device. The method 200 may further include providing a GUI 74 associated with the indicators associated with each of the candidate objects 52, which may be helpful in the case of candidate objects 52 being offscreen the display 48.

The method 200 may further include, via the machine learning model, executing the command 33 without disambiguation input 68 from the user; upon executing the command 33 with incorrect output, receiving a new interaction from the user including a new command 33 to correct an action of the machine learning model; and further training the machine learning model using new disambiguation input and data about the spatialized regions associated with a newly selected target object.

As detailed above, the computing system 10 may provide a number of potential advantages for AR/VR systems where one of a plurality of objects may be the intended receiver of a user command 33. Although it is known in some systems to provide visual indicators to a user that may describe tools or commands available in a display, the system 10 may be configured to determine a set of candidate objects 52 distinct from the set of all objects in the AR/VR environment, query the user directly to receive disambiguation input 68, and train a machine learning model with secondary input 45 from the user that intimates a target object 70 from the set of candidate objects 52. Thus, the potential advantages of the system 10 may range from distinguishing of user input with respect to objects in the AR/VR environment to improve target object 70 selection and refinement of response of the system 10 to future user commands by enhancing a machine learning model.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
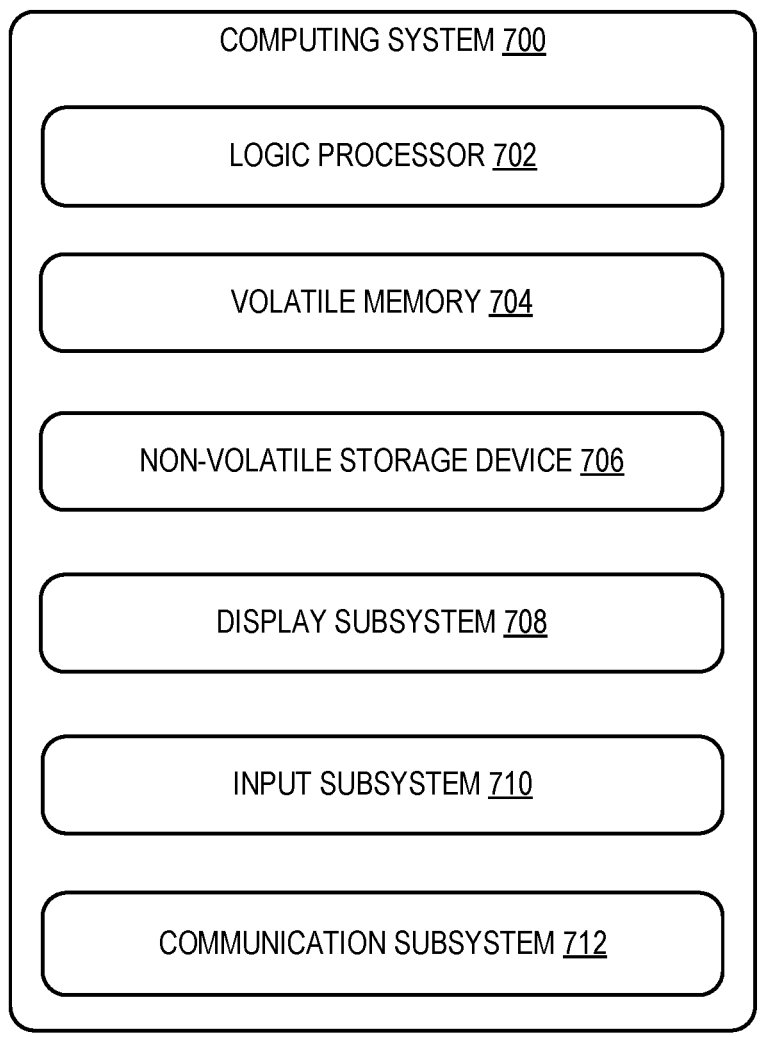
FIG. 7 is an example computing environment, which may be used to implement the computing system of FIG. 1.

FIG. 7 schematically shows a non-limiting embodiment of a computing system 700 that can enact one or more of the methods and processes described above. Computing system 700 is shown in simplified form. Computing system 700 may embody the computing device described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor 702 may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem 710 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem 712 may allow computing system 700 to send and/or receive messages to and/or from other devices via a network such as the Internet.

The following paragraphs provide additional support for the claims of the subject application. One aspect provides a method for use with a computing device, comprising, at a processor of a display device, receiving a command from a user by way of natural language input; identifying a set of candidate objects within or adjacent a user's field of view via the display device having associated spatialized regions on which the command is capable of being executed, the set of candidate objects being identified at least partially by using a machine learning model; displaying visual indicators or emitting audio indicators associated with each of the candidate objects; querying the user for a disambiguation input via the indicators; receiving the disambiguation input from the user that selects a target object from the set of candidate objects; executing the command on the target object; and training the machine learning model using the disambiguation input and data about the spatialized regions associated with the selected target object.

In this aspect, additionally or alternatively, the method may further comprise identifying secondary input from the user that is different from a semantic input in the command and weighting the secondary input from the user to determine a probability for each of the candidate objects to be the target object. In this aspect, additionally or alternatively, the method may further comprise training the machine learning model using the weighted secondary input from the user. In this aspect, additionally or alternatively, the method may further comprise training an algorithm to select the target object with the weighted secondary input from the user. In this aspect, additionally or alternatively, the secondary input may include one or more of a non-semantic input of the command, a pose of the user, a gaze direction of the user, and a controller input of a controller operated by the user.

In this aspect, additionally or alternatively, the candidate objects may be virtual objects or real objects, and at least one object in the set of candidate objects may be offscreen a display of the computing device. In this aspect, additionally or alternatively, the command may be received as a vocal command, and the disambiguation input may include at least one type of input selected from the group consisting of speech input, gaze input, gesture input, and text input. In this aspect, additionally or alternatively, the method may further comprise providing a graphical user interface associated with the indicators associated with each of the candidate objects. In this aspect, additionally or alternatively, the method may further comprise training a speech recognition model using the command and disambiguation input, the speech recognition model configured to output processing of vocal input to disambiguate similar sounding words of the user. In this aspect, additionally or alternatively, the indicators may be selected from the group consisting of bounding boxes, highlighted object perimeters, tooltips, directional indicators, overlapping indicators, and auditory indicators.

In this aspect, additionally or alternatively, the method may further comprise, via the machine learning model, executing the command without disambiguation input from the user; upon executing the command with incorrect output, receiving a new interaction from the user including a new command to correct an action of the machine learning model; and further training the machine learning model using new disambiguation input and data about the spatialized regions associated with a newly selected target object.

Another aspect provides a computing system comprising a processor of a display device configured to execute one or more programs, the processor configured to: receive a command from a user by way of natural language input; identify a set of candidate objects within or adjacent a user's field of view via the display device having associated spatialized regions on which the command is capable of being executed, the set of candidate objects being identified at least partially by using a machine learning model; display visual indicators or emit audio indicators associated with each of the candidate objects; query the user for a disambiguation input via the indicators; receive the disambiguation input from the user that selects a target object from the set of candidate objects; execute the command on the target object; and train the machine learning model using the disambiguation input and data about the spatialized regions associated with the selected target object.

In this aspect, additionally or alternatively, the processor may be further configured to identify secondary input from the user and weight the secondary input from the user to determine a probability for each of the candidate objects to be the target object. In this aspect, additionally or alternatively, the processor may be further configured to train the machine learning model using the weighted secondary input from the user. In this aspect, additionally or alternatively, the secondary input may include one or more of a non-semantic input of the command, a pose of the user, a gaze direction of the user, and a controller input of a controller operated by the user. In this aspect, additionally or alternatively, the candidate objects may be virtual objects or real objects, and at least one object in the set of candidate objects may be offscreen a display of the computing device.

In this aspect, additionally or alternatively, the command may be received as a vocal command, and the disambiguation input may include at least one type of input selected from the group consisting of speech input, gaze input, gesture input, and text input. In this aspect, additionally or alternatively, the processor may be further configured to train a speech recognition model using the command and disambiguation input, the speech recognition model configured to output processing of vocal input to disambiguate similar sounding words of the user. In this aspect, additionally or alternatively, the processor may be further configured to: via the machine learning model, execute the command without disambiguation input from the user; upon executing the command with incorrect output, receive a new interaction from the user including a new command to correct an action of the machine learning model; and further train the machine learning model using new disambiguation input and data about the spatialized regions associated with a newly selected target object.

Another aspect provides a method for use with a computing device, comprising, at a processor of a display device: receiving a command from a user by way of natural language input; identifying secondary input from the user; identifying a set of candidate objects within or adjacent a user's field of view via the display device having associated spatialized regions on which the command is capable of being executed; weighting the secondary input from the user to determine a probability for each of the candidate objects to be the target object, the set of candidate objects being identified at least partially by using a machine learning model; displaying visual indicators or emitting audio indicators associated with each of the candidate objects; querying the user for a disambiguation input via the indicators; receiving the disambiguation input from the user that selects the target object from the set of candidate objects; executing the command on the target object; and training the machine learning model using the disambiguation input, data about the spatialized regions associated with the selected target object, and the weighted secondary input from the user, wherein the candidate objects are virtual objects or real objects.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for use with a computing device, comprising: at a processor of a display device:
   receiving a command from a user by way of natural language input;
   identifying a set of candidate objects within or adjacent a user's field of view via the display device having associated spatialized regions on which the command is capable of being executed, the set of candidate objects being identified at least partially by using a machine learning model;
   displaying visual indicators or emitting audio indicators associated with each of the candidate objects;
   querying the user for a disambiguation input via the indicators;
   receiving the disambiguation input from the user that selects a target object from the set of candidate objects;
   executing the command on the target object; and
   training the machine learning model using the disambiguation input and data about the spatialized regions associated with the selected target object.

2. The method of claim 1, further comprising identifying secondary input from the user that is different from a semantic input in the command; and
   weighting the secondary input from the user to determine a probability for each of the candidate objects to be the target object.

3. The method of claim 2, further comprising training the machine learning model using the weighted secondary input from the user to obtain an updated machine learning model executable by the computing device to identify, at least partially by using the updated machine learning model, one or more subsequent sets of candidate objects.

4. The method of claim 2, further comprising training an algorithm to select the target object with the weighted secondary input from the user.

5. The method of claim 2, wherein the secondary input includes one or more of a non-semantic input of the command, a pose of the user, a gaze direction of the user, and a controller input of a controller operated by the user.

6. The method of claim 1, wherein the candidate objects are virtual objects or real objects, and
at least one object in the set of candidate objects is offscreen a display of the computing device.

7. The method of claim 1, wherein the command is received as a vocal command, and
the disambiguation input includes at least one type of input selected from the group consisting of speech input, gaze input, gesture input, and text input.

8. The method of claim 1, further comprising providing a graphical user interface associated with the indicators associated with each of the candidate objects.

9. The method of claim 1, further comprising training a speech recognition model using the command and disambiguation input, the speech recognition model configured to output processing of vocal input to disambiguate similar sounding words of the user.

10. The method of claim 1, wherein the indicators are selected from the group consisting of bounding boxes, highlighted object perimeters, tooltips, directional indicators, overlapping indicators, and auditory indicators.

11. The method of claim 3, further comprising:
via the machine learning model, executing the command without disambiguation input from the user;
upon executing the command with incorrect output, receiving a new interaction from the user including a new command to correct an action of the machine learning model; and
further training the machine learning model using new disambiguation input and data about the spatialized regions associated with a newly selected target object.

12. A computing system, comprising:
a processor of a display device configured to execute one or more programs, the processor configured to:
receive a command from a user by way of natural language input;
identify a set of candidate objects within or adjacent a user's field of view via the display device having associated spatialized regions on which the command is capable of being executed, the set of candidate objects being identified at least partially by using a machine learning model;
display visual indicators or emit audio indicators associated with each of the candidate objects;
query the user for a disambiguation input via the indicators;
receive the disambiguation input from the user that selects a target object from the set of candidate objects;
execute the command on the target object; and
train the machine learning model using the disambiguation input and data about the spatialized regions associated with the selected target object.

13. The system of claim 12, the processor further configured to identify secondary input from the user; and
weight the secondary input from the user to determine a probability for each of the candidate objects to be the target object.

14. The system of claim 13, the processor further configured to train the machine learning model using the weighted secondary input from the user to obtain an updated machine learning model executable by the computing device to identify, at least partially by using the updated machine learning model, one or more subsequent sets of candidate objects.

15. The system of claim 13, wherein the secondary input includes one or more of a non-semantic input of the command, a pose of the user, a gaze direction of the user, and a controller input of a controller operated by the user.

16. The system of claim 12, wherein the candidate objects are virtual objects or real objects, and
at least one object in the set of candidate objects is offscreen a display of the computing device.

17. The system of claim 12, wherein the command is received as a vocal command, and
the disambiguation input includes at least one type of input selected from the group consisting of speech input, gaze input, gesture input, and text input.

18. The system of claim 12, the processor further configured to train a speech recognition model using the command and disambiguation input, the speech recognition model configured to output processing of vocal input to disambiguate similar sounding words of the user.

19. The system of claim 14, the processor further configured to:
via the machine learning model, execute the command without disambiguation input from the user;
upon executing the command with incorrect output, receive a new interaction from the user including a new command to correct an action of the machine learning model; and
further train the machine learning model using new disambiguation input and data about the spatialized regions associated with a newly selected target object.

20. A method for use with a computing device, comprising:
at a processor of a display device:
receiving a command from a user by way of natural language input;
identifying secondary input from the user;
identifying a set of candidate objects within or adjacent a user's field of view via the display device having associated spatialized regions on which the command is capable of being executed;
weighting the secondary input from the user to determine a probability for each of the candidate objects to be the target object, the set of candidate objects being identified at least partially by using a machine learning model;
displaying visual indicators or emitting audio indicators associated with each of the candidate objects;
querying the user for a disambiguation input via the indicators;
receiving the disambiguation input from the user that selects the target object from the set of candidate objects;
executing the command on the target object; and
training the machine learning model using the disambiguation input, data about the spatialized regions associated with the selected target object, and the weighted secondary input from the user, wherein the candidate objects are virtual objects or real objects.

* * * * *